United States Patent Office 3,359,276
Patented Dec. 19, 1967

3,359,276
PHOSPHINIC AMIDES
Morris L. Nielsen, Dayton, Ohio, and Robert Z. Greenley, St. Louis, Mo., assignors, by mesne assignments, to Monsanto Research Corporation, St. Louis, Mo., a corporation of Delaware
No Drawing. Filed Sept. 1, 1966, Ser. No. 576,537
16 Claims. (Cl. 260—309)

ABSTRACT OF THE DISCLOSURE

Compounds of the class of phosphinic amides having one or two imidazol-1-yl radicals bonded to phosphorus, useful as flame-retarding agents for cellulosic products and as preignition-inhibiting additives, and the process for making them by transamidation.

---

This application is a continuation-in-part of our applications Ser. No. 333,194, filed Dec. 24, 1963 and Ser. No. 421,657, filed Dec. 28, 1964, and now abandoned.

This invention relates to organic compounds of phosphorus and nitrogen and more particularly provides a new and valuable class of phosphinic amides, to methods of preparing the same and to the method of preparing valuable polymeric materials in which the amides are useful.

The presently provided compounds are phosphinic amides having one or two imidazol-1-yl radicals bonded to phosphorus and are represented by the structure

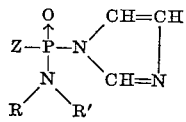

wherein Z is selected from the class consisting of imidazol-1-yl radical and an aromatic hydrocarbyl radical of 6 to 12 carbon atoms which is free of aliphatic unsaturation and is bonded through nuclear carbon to the remainder of the molecule, and R is hydrocarbyl radical which is free of olefinic and acetylenic unsaturation and contains from 1 to 12 carbon atoms and R' is selected from the class consisting of R and hydrogen.

Compounds of the above formula are either P,P-diimidazol-1-ylphosphinic amides of the formula

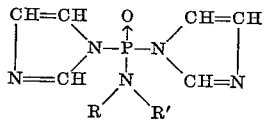

wherein R and R' are as defined above, or P-aryl-P-imidazol-1-ylphosphinic amides of the formula

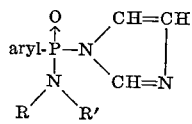

wherein aryl denotes the above defined aromatic hydrocarbon radical and R and R' are as defined above.

Depending upon whether R' is hydrocarbyl or hydrogen, the compounds are N-hydrocarbyl- or N,N-dihydrocarbyl-P,P-diimidazol-1-ylphosphinic amides when Z is the imidazolyl radical; or when Z is the aryl radical, the compounds are N-hydrocarbyl- or N,N-dihydrocarbyl-P-aryl-P-imidazol-1-ylphosphinic amides.

One method of preparing the N-hydrocarbyl or N,N-dihydrocarbyl-P,P-diimidazol-1-ylphosphinic amides involves the reaction of triimidazol-1-ylphosphine oxide with a primary or secondary amine as shown in the following scheme:

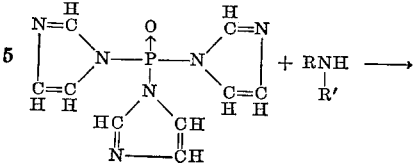

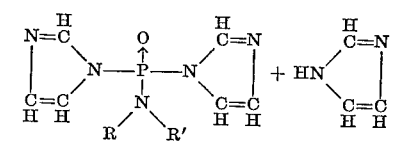

Another method involves the reaction of a hydrocarbylphosphoramidic dihalide with an alkali metal imidazolide as shown in the following scheme:

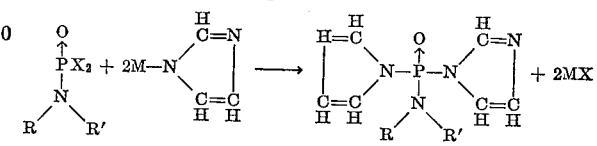

where R and R' are as above defined, M is alkali metal, e.g., sodium, potassium, lithium or rubidium, and X is halogen with atomic weight greater than 35.

Still another method involves condensation of imidazole with the hydrocarbylphosphoramidic dihalide, the reaction taking place substantially according to the scheme:

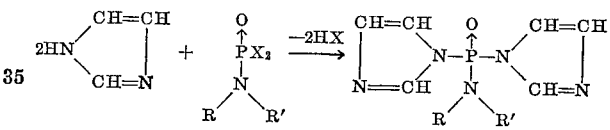

Presently useful amines are methylamine, dimethylamine, ethylamine, ethylmethylamine, diisopropylamine, isobutylamine, n-propylamine, cyclohexylamine, benzylamine, aniline, 1-naphthylamine, diphenylamine, and biphenylamine.

Presently useful hydrocarbylphosphoramidic dihalides are: e.g., methyl-, ethyl-, n-propyl-, cyclohexyl-, benzyl-, phenyl-, 1-naphthyl-, and 4-biphenylylphosphoramidic dichloride, dibromide or diiodide.

The useful dihydrocarbylphosphoramidic dihalides include the dialkyl, the diaryl, and the dicycloalkyl phosphoramidic dichlorides, dibromides or diiodides as well as compounds in which the hydrocarbyl substituents are dissimilar, e.g., dimethyl-, diethyl-, dipropyl-, dibutyl-, dipentyl-, dihexyl-, dioctyl-, dinonyl-, didecyl- or didodecylphosphoramidic dichloride or dibromide; dicyclopropyl-, dicyclohexyl- or bis(2-methylcyclopentyl)phosphoramidic dichloride, dibromide or diiodide; the diphenylphosphoramidic dichloride or dibromide, di-o-, m- or p-tolyphosphoramidic dibromide or diiodide, bis(o-, m- or p-ethylphenyl-)phosphoramidic dichloride or diiodide, bis(o-, m- or p-butylphenyl-)phosphoramidic dichloride or dibromide, bis(o-, m- or p-hexylphenyl) phosphoramidic dibromide or diisodide, bis(2,3-, 3,4- or 4,5-dipropylphenyl)phosphodamidic dibromide or dichloride, bis(pentamethylphenyl)phosphoramidic dichloride or dibromide, bis(cycloalkylphenyl)phosphoramidic dibromides or dichlorides such as bis(o-, m- or p-cyclohexyl- or cyclopentylphenyl).phosphoramidic dichloride or dibromide, di-o-, m- or p-biphenylylphosphoramidic dichloride or dibromide; di-1-acenaphthenylphosphoramidic dibromide or dichloride, dibenzylphosphoramidic dichloride or dibromide, di-α- or β-naphthylphosphoramidic dibromide or diiodide, methyl-p-tolylphosphoramidic dichloride or dibromide, isopropylphenylphosphoramidic dibromide or diiodide, cyclohexylphenylphosphoramidic dichloride or dibromide, heptyl(2-pentylphenyl)phosphoramidic dichlodide or dibromide, phenyl(3-phenylpropyl)phosphoramidic diiodide or dibromide, biphenylylbutylphosphoramidic dichloride or dibromide, α - naphthyloctylphosphoramidic dichloride or dibromide, α-naphthylbutylphosphoramidic dichloride or dibromide, ethyl-3-fluorenylphosphoramidic dichloride or dibromide, methyldodecylphosphoramidic dichloride or diiodide, phenyl-m-tolylphosphoramidic dibromide or dichloride, etc.

Examples of the presently provided N-hydrocarbyl- or N,N-dihydrocarbyl-P,P-diimidazol-1-ylphosphinic amides are the N-aryl or the N,N-diaryl compounds such as P,P-diimidazol-1-yl-N-phenylphosphinic amide, P,P-diimidazol-1-yl-N,N-diphenylphosphinic amide, P,P-diimidazol-1-yl-N,N- di-o-, m- or p-tolylphosphinic amide, P,P-diimidazol-1-yl-N-α- or β-naphthylphosphinic amide, N,N-dibiphenylyl-P,P-diimidazol-1-ylphosphinic amide and N-3 - acenaphthenyl-P,P-diimidazol-1-ylphosphinic amide; the N- aralkyl or the N,N-bis(aralkyl) compounds such as P,P-diimidazol-1-yl - N - (2-phenylethyl)phosphinic amide and N,N - dibenzyl-P,P-diimidazol-1-ylphosphinic amide; the cycloalkyl compounds such as N,N-dicyclopentyl-P,P-diimidazol-1-ylphonsphinic amide and diimidazol-1-yl-N-(p-cyclohexylphenyl) - P,P - diimidazol-1-yl-phosphinic amide; the alkyl compounds such as P,P-diimidazol-1-yl-N,N-dimethylphosphinic amide, N,N - dibutyl-P,P-diimidazol-1-ylphosphinic amide, P,P - diimidazol-1-yl-N-ethylphosphinic amide, N,N - bis(2 - ethylhexyl)-P,P-diimidazol-1-ylphosphinic amide and N,N-didodecyl-P,P-diimidazol-1-ylphosphinic amide; mixed N,N-derivatives such as N-benzyl-P,P-diimidazol-1-yl-N-propylphosphinic amide, N - 4 - ethylphenyl-P,P-diimidazol-1-yl-N-phenylphosphinic amide, N-ethyl-P,P-diimidazol-1-yl-N-β-naphthylphosphinic amide, etc. Particularly useful are the N-alkyl-N-aryl-P,P-diimidazol-1-ylphosphinic amides having 1 to 12 carbon atoms in the alkyl and 6 to 12 carbon atoms in the aryl, e.g., the N-methyl-N-p-tolyl or the N-butyl-N-phenyl or the N-dodecyl-N-phenyl or the N-ethyl-N-p-biphenylyl compounds since therein the blending of aliphatic and aromatic substituents results in a plasticizing and toughening effect when they are used as starting materials for the preparation of polymers.

The N-hydrocarbyl- and the N,N-dihydrocarbyl-P-aryl-P-imidazol-1-ylphosphinic amides are prepared, according to this invention, by reaction of a diimidazol-1-ylarylphosphine oxide with a primary or secondary amine, whereby transamidation occurs, substantially according to the scheme:

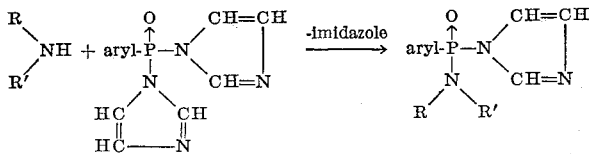

wherein R is hydrocarbyl and R' is R or hydrogen.

The diimidazol-1-ylhydrocarbylphosphine oxides which are employed in the above reaction are readily obtainable by contacting imidazole with a hydrocarbylphosphonic dihalide, preferably in the presence of a hydrogen halide scavenger and in the presence or absence of an inert diluent or solvent, as described in U.S. Patent No. 3,227,727 to R. Z. Greenley and M. L. Nielsen. For example, reaction of, say, p-tolylphosphonic dichloride with two molar equivalents of imidazole in the presence of triethylamine as hydrogen halide scavenger yields diimidazol-1-yl-p-tolylphosphine oxide of present utility in the above depicted transamidation reaction.

Examples of presently useful phosphine oxides are diimidazol-1-ylphenyl-, diimidazol-1-yl-(o-, m-, or p-tolyl)-, diimidazol-1-yl-(o-, m- or p-isopropylphenyl)-, diimidazol-1-yl-(o-, m- or p-pentylphenyl)-, diimidazol-1-yl-(2,3- or 3,4- or 4,5-dimethylphenyl)-, (o-, m- or p-cyclohexylphenyl)diimidazol-1-yl-, (o-, m-, or p-biphenylyl)diimidazol-1-yl-, or diimidazol-1-yl-α-methyl-β-naphthylphosphine oxide.

Primary amines with which the phosphine oxides are reacted to give the N-hydrocarbyl-P-aryl-P-imidazol-1-ylphosphinic amides are, e.g., aniline, benzylamine, cyclohexylamine, α- or β-naphthylamine, methylamine, n-propylamine, isobutylamine, pentylamine, 2-ethylhexylamine, tert-nonylamine, undecylamine, dodecylamine, etc.

Dihydrocarbylamines with which the diimidazol-1-ylhydrocarbylphosphine oxides are reacted to give N,N-dihydrocarbyl-P-aryl-P-imidazol-1-ylphosphinic amides by transamidation are, e.g., dimethyl-, diethyl-, dibutyl, dihexyl-, diphentyl-, dioctyl-, didodecyl-, diphenyl-, bis(o-, m- or p-ethylphenyl)-, bis(pentamethylphenyl)-, bis(hexylphenyl)-, di-α- or β-naphthyl-, difluorenyl-, diacenaphthenyl-, dicyclopentyl-, dibiphenylyl-, dodecylmethyl-, cyclohexylphenyl-, ethylphenyl-, biphenylyl-p-tolyl-, mesitylpropyl- or butylcyclopropylamine.

Examples of the N-hydrocarbyl- or the N,N-dihydrocarbyl-P-aryl-P-imidazol-1-ylphosphinic amides of the invention are P-imidazol-1-yl-N,N,P-triphenyl-, P-imidazol-1-yl-N,P-diphenyl-, P-imidazol-1-yl-N,N-dimethyl-P-phenyl-,P-imidazol-1-yl-N-methyl-P-phenyl-, P-imidazol-1-yl-N-phenyl-N-propyl-P-(o-, m- or p-tolyl)-, N,N-didodecyl-P-imidazol-1-yl-P-α- or β-naphthyl-, P-1-acenaphthenyl-N-cyclohexyl-P-imidazol-1-yl-N-phenyl-, P-(p-hexylphenyl)-P-imidazol-1-yl-N-pentyl, N-butyl-P-(m-cyclopentylphenyl)-P-imidazol-1-yl-N-phenyl-, N,N,P-tris(o-, m- or p-ethylphenyl)-P-imidazol-1-yl-, biphenylyl-N-ethyl-P-imidazol - 1 - yl - , N-benzyl-P-imidazol-1-yl-P-(pentamethylphenyl)-, N,N - dicyclohexyl - P - imidazol-1-yl-P-phenyl-, and P-(tert-butylphenyl)-N-ethyl-P-imidazol-1-yl-N-p-tolylphosphinic amides.

In preparing the P,P-diimidazol-1-yl-N-hydrocarbylphosphinic amides or the P,P-diimidazol-1-yl-N,N-dihydrocarbylphosphinic amides from triimidazol-1-ylphosphine oxide and a primary or secondary amine, the two reactants are advantageously employed in substantially equimolar proportions. A substantial excess of either reactant should be avoided since undesirable by-products may be formed when deviating substantially from the one-to-one ratio.

Generally the reaction is exothermic; hence, heating is usually not required and the reaction may be conducted by operating at ambient temperatures, or even with cooling. When especially reactive materials are used, it may be necessary, in order to obtain high yields of the phosphinic amides, to moderate the reaction by either maintaining a slow rate of addition of one reactant to the other, by operating in the presence of a diluent, or by stirring so that localized overheating does not occur. However, when working with the somewhat sluggish higher amines, e.g., naphthylamine, didodecylamine or biphenylamine, heating may be used for the purpose of decreasing reaction time. Temperatures of from, say, 30° C. to 85° C. are thus useful as well as refluxing temperature when working in the presence of a diluent or solvent.

Advantageously, in order to obtain smooth reaction and optimum yield of the product, the reaction is conducted in the presence of an inert organic liquid diluent or solvent, which may be, e.g., an aliphatic or aromatic hydrocarbon such as hexane, benzene or xylene; a chlorinated hydrocarbon such as chloroform, carbon tetrachloride or chlorobenzene; an ether such as butyl ether, morpholine or tetrahydrofuran; a tertiary amide such as dimethylformamide; a sulfoxide such as dimethyl sulfoxide, etc.

We have also found that improved yields are obtained by conforming to a certain order of addition; it is preferred to add the amine to the triimidazol-1-ylphosphine oxide rather than vice versa. This prevents the formation of higher substitution products.

For the separation of by-product imidazole, when the product is a liquid, it will be obvious to one skilled in the art that methods of distillation, solvent extraction, selective adsorption, etc. may be employed. The imidazole may be separated from a solid product simply by preferentially dissolving the imidazole in a solvent such as diethyl ether, benzene or dichloromethane, and filtering, decanting or centrifuging the supernatant liquid from the product. The recovered imidazole is advantageously used in preparing more of the starting material, triimidazol-1-ylphosphine oxide.

In the alternate methods of preparing the P,P-diimidazol-1-yl-N-hydrocarbyl- (or N,N-dihydrocarbyl)phosphinic amides, a hydrocarbylphosphoramidic dihalide is reacted with imidazole or an alkali metal imidazolide. The reaction is effected by simply mixing the two reactants and stirring until formation of said phosphinic amide is completed. Operating temperatures of 30° C. to 85° C. are useful, and an inert, organic liquid diluent or solvent such as dimethoxyethane is conveniently employed.

For preparing good yields the P,P-diimidazol-1-yl-N-hydrocarbylphosphinic amide, the alkali metal imidazolide is preferred to imidazoline. The alkali metal compound is preferably suspended in an organic liquid diluent (rather than dissolved in a solvent) as a means of moderating the reaction and avoiding complicating side-reactions. Thereby the present phosphinic amides are obtained in very good yields. When imidazole is used as the reactant, rather than its alkali metal derivative as herein described, some transamidation with formation of a mono-imidazol-1-yl diamide may occur.

Reaction of the aromatic dihydrocarbylphosphoramidic dihalide with the imidazole proceeds readily to give good yields of the N,N-dihydrocarbyl-P,P-diimidazol-1-ylphosphinic amides. The reaction is conducted by simply mixing the two reactants and allowing the mixture to stand until formation of said phosphinic amide is completed. Advantageously, in order to obtain smooth reaction and optimum yield of the product, the reaction is conducted in the presence of an inert organic liquid diluent or solvent, which may be, e.g., an aliphatic or aromatic hydrocarbon such as hexane, benzene or xylene, a chlorinated hydrocarbon such as chloroform, carbon tetrachloride or chlorobenzene; an ether such as butyl ether, morpholine or tetrahydrofuran; a tertiary amide such as dimethylformamide; a sulfoxide such as dimethylsulfoxide, etc.

The reaction is generally exothermic; hence, heating is usually not required and may be conducted by operating at ambient temperatures, or even with cooling. However, when working with the somewhat sluggish higher hydrocarbylphosphoramidic dihalides, e.g., the di-β-naphthylphosphoramidic dichlorides or the didodecylphosphoramidic dibromides, heating may be used for the purpose of decreasing reaction time. Temperatures of from, say, 60° C. to 150° C. are thus useful. When working in the presence of a diluent or solvent, refluxing temperatures of the reaction mixture are conveniently employed to assure completion of the reaction.

Since reaction occurs with liberation of hydrogen halide it is conveniently effected in the presence of a basic agent which will serve as hydrogen halide scavenger by forming a solid hydrohalide. Conveniently, an excess of the imidazole may be used for this purpose. However, the scavenger may be any organic or inorganic base which does not react with the phosphoramidic dihalide in preference to the imidazole, e.g., a tertiary alkylamine such as trimethylamine or tributylamine; a heterocyclic nitrogen base such as N-methylmorpholine or pyridine, etc. An excess of the imidazole is preferred.

Instead of using a hydrogen halide scavenger, or together with the scavenger, mechanical provision may be made for removal of the hydrogen halide as it is formed, e.g., by means of vigorous stirring and/or dephlegmation.

One mole of the dihydrocarbylphosphoramidic dihalide reacts with two moles of the imidazole to give the present N,N-dihydrocarbyl-P,P-diimidazol-1-ylphosphinic amides; hence, the two reactants may be employed in such stoichiometric proportions. However, as above-stated, an excess of the imidazole is conveniently used for the purpose of serving as scavenger for the by-product hydrogen halide. The hydrohalide thus formed is readily removed from the reaction product by filtering or centrifuging, since it is insoluble in most organic solvents and in the rectants. Any excess of the phosphoramidic dihalide or of imidazole may be separated by distillation.

For preparing the P-aryl-P-imidazol - 1 - ylphosphinic amides:

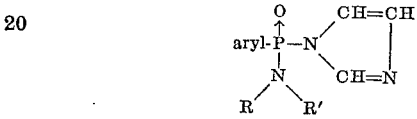

where R is the hydrocarbyl radical and R' is either R or hydrogen, an aryldiimidazol-1-ylphosphinic oxide and a primary or secondary amine are heated together, with replacement of one of the imidazol-1-yl radicals by the amine group. The reaction takes place by heating a mixture of the two reactants at a temperature of, say, from 60° C. to 300° C., and preferably at 125° C. to 250° C. until formation of the N,P-dihydrocarbyl-P-imidazol-1-ylphosphinic amide or the N,N,P-trihydrocarbyl-P-imidazol-1-ylphosphinic amide has occurred. Generally, operation at the higher temperatures decreases reaction time. Heating in an inert atmosphere, say, nitrogen or helium, is advantageous in reducing the possibility of conversion to oxidative by-products, but is not necessary. Neither solvents nor diluents nor catalysts need be employed, although when working with the more volatile amines, i.e., the lower dialkylamines, use of a diluent is convenient, and when employing the higher, more sluggish amines, e.g., didodecylamine or dibiphenylylamine, a catalyst such as p-toluenesulfuric acid or sodium methoxide may be useful. The mono-imidazol-1-yl compound is separated from by-product imidazole and any unreacted starting material by isolating procedures known to those skilled in the art, e.g., fractional distillation or crystallization, solvent extraction, etc. Generally, they are recovered by simply volatilizing the by-product imidazole.

Since formation of the mono-imidazol-1-yl compound takes place by replacement of one of the two imidazol-1-yl radicals of the phosphine oxide by one substituted amino radical, the phosphine oxide and the amine are advantageously employed in stoichiometric proportions. A large excess of amine will tend to replace both of the imidazol-1-yl radicals of the phosphine oxide reactant by dihydrocarbylamine radicals to give phosphonic diamides.

The presently provided arylimidazol-1-ylphosphinic amides and diimidazol-1-ylphosphinic amides are generally rather high melting, crystalline solids which are generally valuable as flame-retarding agents for cellulosic products and for carbonaceous materials generally. They are likewise useful as preignition-inhibiting additives for hydrocarbon fuels comprising tetraethyl lead.

The N - hydrocarbyl-P,P-diimidazol - 1 - ylphosphinic amides are particularly useful as starting materials for the preparation of cross-linkable linear, polymeric phosphonamides by reaction with aromatic diamines. Thus, as disclosed in the copending application of M. L. Nielsen and Leo P. Parts, Ser. No. 421,658, filed Dec. 28, 1964, with xydianiline they react as follows to make diazadiphoshetidine polymers:

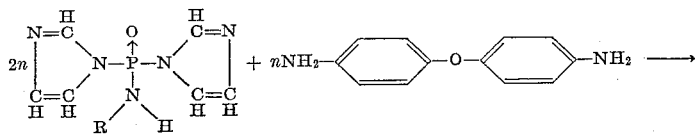

wherein R is a hydrocarbyl radical which is free of olefinic and acetylenic unsaturation and contains from 6 to 12 carbon atoms.

The diazadiphosphetidine polymers range from waxy to high-melting solids. Of particular importance, however, are those polymers which are solid, resinous materials. Such products are readily molded under heat and pressure to give shaped molded objects which are tough, transparent, of good dimensional stability and highly resistant to heat and solvents. The polymers may also be cast into films from solutions thereof or fibers may be prepared therefrom by extruding the polymers through a suitable orifice into a precipitating bath. Solutions of the solid polymers are useful as impregnating agents and adhesives in the manufacture of laminates and as the resin bases of coatings, i.e., paints, varnishes, lacquers and enamels.

The present N-hydrocarbyl-P,P-diimidazol - 1 - ylphosphinic amides and the present N,N-dihydrocarbyl-P,P-diimidazol-1-ylphosphinic amides are of utility in preparing valuable solid, resinous polymers by reaction with 5,5'-bibenzimidazoles as follows:

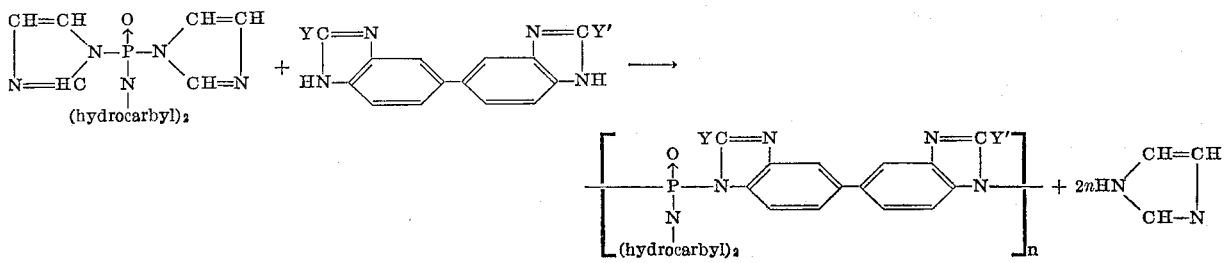

wherein each of Y and Y' is selected from the class consisting of hydrogen and alkyl radicals of from 1 to 5 carbon atoms and $n$ denotes the degree of polymerization.

The polymers are obtained by simply heating substantially equimolar proportions of the two reactants at about 100° C. to 300° C. in the presence or absence of an inert, organic liquid as diluent or solvent. The by-product imidazole is readily removed from the reaction mixture and used to make additional N,N-dihydrocarbyl-P,P-diimidazol - 1-ylphosphinic amide for the polymerization process, i.e., by reaction of the imidazole with a dihydrocarbylphosphoramidic dihalide. The polymers that are obtained are hard, resinous solids which are moldable under heat and pressure, say, at temperatures of from 250° C. to 300° C. and a pressure of 10,000 to 15,000 p.s.i. to give smooth, well-dimensioned, molded objects having great resistance to heat and solvents. Preparation of a polymer having the above-depicted repeating unit, but employing dihydrocarbylphosphoramidic dichloride instead of the diimidazol-1-yl compound shown in the above reaction scheme, is disclosed and claimed in our U.S. Patent No. 3,173,886. Use of the said dichloride in the reaction with the bibenzimidazole compound resulted in evolution of hydrogen chloride as by-product. In order to avoid depletion of the basic-reacting bibenzimidazole by the hydrogen chloride, an extraneous basic agent, e.g., triethylamine was generally employed as hydrogen halide scavenger. The resulting hydrochlorides were then removed with difficulty from the reaction mixture. According to the present invention, no such obstacle arises. Use of the N,N-dihydrocarbyl-P,P-diimidazol-1-ylphosphinic amides instead of said phosphoramidic dihalides results in the production of the readily removable imidazole rather than of hydrogen chloride.

The bibenzimidazoles which are reacted with the N,N-dihydrocarbyl - P,P-diimidazol-1-ylphosphinic amides are high-melting, crystalline solids which are prepared by the reaction of 3, 3', 4, 4'-biphenyltetramine or the hydrochloride thereof with formic acid or an alkanecarboxylic acid in the presence of an acidic catalyst, as disclosed in said U.S. Patent No. 3,173,886.

As disclosed in the copending application of M. L. Nielsen, Ser. No. 333,183, filed Dec. 24, 1963, the presently provided N,N - dihydrocarbyl - P,P-diimidazol-1-ylphosphinic amides are also useful as starting materials for the preparation of valuable, moldable polymers having the repeating unit

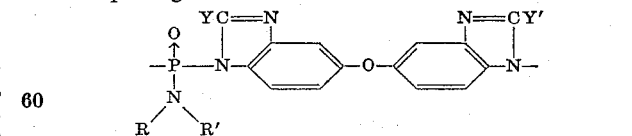

wherein R, R', Y and Y' are as described above. Such polymers are prepared by heating the N,N-dihydrocarbyl-P,P-diimidazol - 1 - ylphosphinic amide with 5,5'-oxydibenzimidazole which, as disclosed in said Nielsen application, is prepared by the reaction of bis(3,3 - diaminophenyl) ether with formic acid, susbtantially according to the scheme:

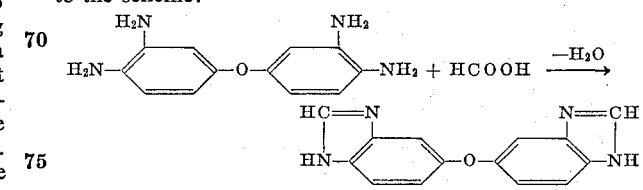

The presently provided mono-imidazol-1-yl compounds, i.e., the N-hydrocarbyl- or N,N-dihydrocarbyl-P-aryl-P-imidazol-1-ylphosphinic amides are valuable flame-retardant agents for cellulosic fibers and textiles. Impregnation of such materials with a solution or dispersion of the phosphinic amide and subsequent baking or air-drying results in substantial suppression of flammability. The mono-imidazoyl compounds also serve simultaneously to increase flame-resistance and to improve the mechanical properties of synthetic resins and plastics, for example, the polyurethanes, the phenolicaldehyde resins and the polyvinyl esters.

The invention is further illustrated by, but not limited to the following examples:

*Example 1*

Diimidazol-1-ylphenylphosphine oxide was prepared as follows: To a stirred solution of 17.0 g. (0.25 mole) of imidazole in 400 ml. of tetrahydrofuran there was added a solution of 12.2 g. (0.063 mole) of phenylphosphonic dichloride in 75 ml. of tetrahydrofuran, over a 15-minute period and under nitrogen. The reaction was then stirred at gentle reflux for 3 hours. After cooling to room temperature, the solid imidazole hydrochloride which had formed as by-product was filtered off under nitrogen by means of a filter stick, and the product was obtained in tetrahydrofuran solution. Removal of the tetrahydrofuran by distillation and vacuum drying of the residual white solid gave the substantially pure diimidazol-1-ylphenylphosphine oxide, M.P. 98–100° C. Nuclear magnetic resonance analysis in dimethylformamide for $P^{31}$ showed a single peak at −6 p.p.m. with respect to $H_3PO_4$.

The above phosphine oxide was converted to the phosphinic amide as follows: A mixture of 0.026 mole of the diimidazol-1-ylphenylphosphine oxide and 0.026 mole of N-methylaniline was heated gradually to 235° C. over a 3-hour period under nitrogen. Vacuum distillation yielded 0.021 mole of imidazole and 5.9 g. (77% theoretical yield), of the substantially pure P-imidazol-1-yl-N-methyl-N,P-diphenylphosphinic amide, B.P. 205–215° C./1 mm. (pot temperature) M.P. 132–9° C., having a nuclear magnetic resonance $P^{31}$ chemical shift (in chloroform) of −16.6 p.p.m. with respect to $H_3PO_4$, and analyzing as follows:

Calc'd for $C_{16}H_{16}N_3OP$, percent: C, 64.64; H, 5.42; N, 14.13; P, 10.42. Found, percent: C, 64.44; H, 5.62; N, 13.89; P, 10.36.

*Example 2*

A mixture of 0.0189 mole of diimidazol-1-ylphenylphosphine oxide and 0.0189 mole of diphenylamine was heated at 150° C. for 15 hours under nitrogen. Vacuum distillation yielded two fractions: (1) B.P. 150–200° C./1 mm. (pot temperature), which was largely imidazole together with a minor amount of unreacted diphenylamine, and (2) the substantially pure-P-imidazol-1-yl-N,N,P-triphenylphosphinic amide, B.P. 200–250° C./1 mm., which upon crystallization from chloroform-heptane melted at 178–86° C., and analyzed as follows:

Calc'd for $C_{21}H_{18}N_3OP$, percent: C, 70.19; H, 5.05; N, 11.69; P, 8.62. Found, percent: C, 69.97; H, 5.05; N, 11.86; P, 8.44.

Nuclear magnetic resonance in chloroform gave a $P^{31}$ chemical shift at −12.7 p.p.m. with respect to $H_3PO_4$.

The P-imidazol-1-yl-N,N,P-triphenylphosphinic amide was found to be soluble in chloroform, benzene, ethanol, acetone or dioxane, slightly soluble in ethyl ether and insoluble in heptane, cyclohexane and water. It was stable toward moisture and was recoverable from an ethanol-water solution on evaporation under vacuum.

*Example 3*

To 17.00 g. of imidazole in 400 ml. of dry tetrahydrofuran there was added 14.00 g. of methylphenylphosphoramidic dichloride in 75 ml. of tetrahydrofuran during a 20-minute period. The mixture was stirred at gentle reflux under nitrogen for two hours. By-product imidazole hydrochloride was then filtered off under nitrogen by means of a filter stick. Evaporation to dryness of the filtrate gave as residue an 81% theoretical yield of the substantially pure P,P - dimidazol - 1-yl-N-methyl-N-phenylphosphinic amide, M.P. 122–123° C., and analyzing as follows:

Calc'd for $C_{13}H_{14}N_5OP$, percent: C, 54.35; H, 4.91; N, 24.38; P, 10.79. Found percent: C, 54.06; H, 4.97; N, 24.10; P, 10.50.

Nuclear magnetic resonance analysis of the compound in dimethylformamide for $P^{31}$ gave a chemical shift at +7.6 p.p.m. with respect to $H_3PO_4$.

*Example 4*

A solution of 54.4 g. (0.8 mole) of imidazole dissolved in 600 ml. of benzene and warmed to about 50° C. was added dropwise during about 10 minutes to 44.8 g. (0.2 mole) of methylphenylphosphoramidic dichloride. The temperature rose exothermally to 75° C. When introduction of the imidazole solution had been completed, the whole was refluxed for about two hours. The solids which had formed were filtered off under pressure; and upon cooling the filtrate, crystals of the substantially pure P,P - bis(1 - imidazolyl) - N-methyl-N-phenylphosphinic amide separated out.

*Example 5*

To a slurry of 0.125 mole of triimidazol-1-ylphosphine oxide (described by Cramer et al. in Chem. Ber. 94, 1612 (1961)), in 350 ml. dry toluene was added 0.125 mole of aniline and the mixture was heated at 50–60° C. for 3.5 hours under dry nitrogen. The solids that formed were removed by centrifuging, taking care to exclude moisture, and were repeatedly rinsed with dichloromethane to remove the by-product imidazole. The remaining product, after removal of solvent, represented a yield of 84% of the substantially pure P,P-diimidazol-1-yl-N-phenylphosphinic amide, M.P. 163–4° C. It was readily soluble in 1-methyl-2-pyrrolidilinone and slightly soluble in hot toluene. The $P^{31}$ NMR chemical shift was +11.9 p.p.m. The X-ray diffraction pattern was new and unique, with the interplanar distances (A) of the three principal lines as follows: 3.50, 5.37 and 4.31. Analysis of the product showed the compound

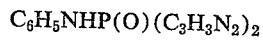

to be as follows:

Calc'd for $C_{12}H_{12}N_5OP$, percent: C, 52.75; H, 4.43; N, 25.63; P, 11.34. Found percent: C, 50.20; H, 4.89; N, 25.62; P, 10.26.

*Example 6*

To a slurry of 0.425 mole sodium imidazolide in 250 ml. dry dimethoxyethane (DME) was added, with care to exclude atmospheric moisture, a solution of 0.2 mole phenylphosphoramidic dichloride, $C_6H_5NHP(O)Cl_2$, in 100 ml. dry DME. The reaction was moderated with ice-cooling so that the temperature of the reaction mixture during the addition step did not exceed 40° C. when addition was complete, the mixture was heated at reflux (ca. 85° C.) for 45 minutes. The mixture was then cooled and centrifuged so as to separate the solids which contained the product and by-product sodium chloride. Solvent extraction with a solvent such as toluene or 1-methyl-2-pyrrolidinone and evaporation of the solvent from the extract gave as residue the substantially pure P,P-diimidazol-1-yl-N-phenylphosphinic amide.

*Example 7*

This example describes the preparation of a polymer from 5,5'-bibenzimidazole and P,P-diimidazol-1-yl-N-methyl-N-phenylphosphinic amide.

5,5'-bibenzimidazole was prepared as follows: A mixture consisting of 7.0 g. (0.02 mole) of 3,3',4,4'-biphenyltetramine tetrahydrochloride, 17.4 g. (0.38 mole) of formic acid and 38 ml. of 5 N-hydrochloric acid was heated at reflux for 0.5 hour. The resulting reaction mixture was poured into a mixture of 55 ml. of concentrated ammonium hydroxide and ice, and the solid which formed was filtered off and dissolved in methanol. After filtering the methanol solution in order to clarify it, it was evaporated to dryness and the residue was ether washed. There was thus obtained 4.0 g. (80% theoretical yield) of the substantially pure 5,5'-bibenzimidazole, M.P. 265–7° C. and analyzing as follows:

Calc'd for $C_{14}H_{10}N_4$, percent: C, 71.78; H, 4.30; N, 23.92. Found, percent: C, 71.60; H, 4.18; N, 23.67.

Conversion to polymer was conducted as follows: A mixture of 4.306 g. (0.015 mole) of the P,P-diimidazol-1-yl-N-methyl-N-phenylphosphinic amide and 3.510 g. of the 5,5'-bibenzimidazole was heated in a reaction vessel equipped with an air condenser. Imidazole began to collect in the condenser at a pot temperature of 190° C., at which point the reaction mixture had completely melted. Within an hour, the temperature was increased to 225° C. and within the next hour to 255° C. Heating was then discontinued. Then, at a temperature of 185° C., vacuum was applied to the system in order to remove volatiles, which were collected in a Dry Ice trap. The residue was cooled, the resulting mass was powdered and the powder was heated under vacuum up to 300° C. The product remained a black powder. There was thus obtained 5.472 g. (99% theoretical yield) of polymer consisting essentially of the repeating unit

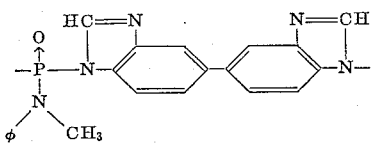

where φ denotes phenyl. The polymer had a softening point of 350° C. Molding at a pressure of ca. 12,000 p.s.i. and a temperature of from 300° C. to 350° C. gives a hard well-dimensioned, molded test specimen.

The above examples are given by way of illustration only, and the present invention is not to be considered as limited by them. It will be obvious to those skilled in the art that many modifications can be made within the spirit of the invention, which is limited only by the terms of the appended claims.

What we claim is:
1. A compound of the formula

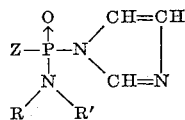

wherein Z is selected from the class consisting of the imidazol-1-yl radical and an aromatic hydrocarbyl radical of 6 to 12 carbon atoms which is free of aliphatic unsaturation and is bonded through nuclear carbon to the remainder of the molecule and R is a hydrocarbyl radical of from 1 to 12 carbon atoms which is free of olefinic and acetylenic unsaturation, and R' is selected from the class consisting of R and hydrogen.

2. The compound defined in claim 1, further limited in that Z is the imidazol-1-yl radical.

3. The compound defined in claim 1, further limited in that Z is an aromatic hydrocarbyl radical of from 6 to 12 carbon atoms.

4. The compound defined in claim 1, further limited in that R' is hydrogen.

5. The compound defined in claim 1, further limited in that Z is phenyl and each of R and R' is aryl of from 6 to 12 carbon atoms.

6. The compound defined in claim 1, further limited in that Z is phenyl, R is alkyl of from 1 to 12 carbon atoms, and R' is aryl of from 6 to 12 carbon atoms.

7. The compound defined in claim 1, further limited in that Z is the imidazol-1-yl radical, R is phenyl and R' is methyl.

8. The compound defined in claim 1, further limited in that each of Z, R and R' is phenyl.

9. The compound defined in claim 1, further limited in that each of Z and R is phenyl and R' is methyl.

10. The compound defined in claim 1, further limited in that Z is the imidazol-1-yl radical, R is phenyl and R' is hydrogen.

11. The method which comprises heating, at a temperature of 60° C. to 300° C., a phosphine oxide of the formula

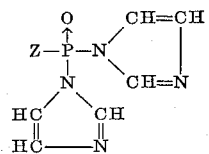

wherein Z denotes the imidazol-1-yl radical or an aromatic hydrocarbyl radical of from 6 to 12 carbon atoms which is free of aliphatic unsaturation and is linked through nuclear carbon to the remainder of the molecule, with an amine of the formula

wherein R is a hydrocarbyl radical of from 1 to 12 carbon atoms which is free of olefinic and acetylenic unsaturation, and R' is R or hydrogen, to obtain a phosphinic amide of the formula

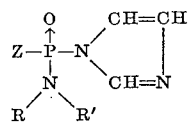

wherein Z, R and R' are as defined above.

12. The method defined in claim 11, further limited in that Z is the imidazol-1-yl radical.

13. The method defined in claim 11, further limited in that Z is an aromatic hydrocarbyl radical of from 6 to 12 carbon atoms.

14. The method defined in claim 11, in which Z and R are phenyl radicals and R' is the methyl radical.

15. The method defined in claim 11, in which each of Z, R, and R' is phenyl.

16. The method defined in claim 11, in which Z is the imidazol-1-yl radical, R is phenyl and R' is hydrogen.

References Cited

UNITED STATES PATENTS

| | | | |
|---|---|---|---|
| 2,852,550 | 9/1958 | Godfrey | 260—551 |
| 3,111,525 | 11/1963 | Meltzer et al. | 260—309 |
| 3,111,526 | 11/1963 | Koopmans et al. | 260—309 |
| 3,120,542 | 2/1964 | Anderson et al. | 260—309 |
| 3,227,727 | 1/1966 | Greenley et al. | 260—309 |
| 3,227,728 | 1/1966 | Parts | 260—309 |

(Other references on following page)

OTHER REFERENCES

Greenley et al., Jour. Org. Chem., vol. 29, pp. 1009–13 (May 1964).

Houben-Weyl, Methoden der Organischen Chemie (Organische Phosphor Verbindungen), vol. 12, part 1, pp. 262–3, Stuttgart, Georg Thieme, 1963.

Kosolapoff et al., Jour. Org. Chem., vol 21, pp. 413–14 (1956).

Nielsen et al., Jour. Phys. Chem., vol. 68, p. 155 (January 1964).

Nielsen et al., Jour. Chem. and Eng. Data, vol. 9, p. 169 (April 1964).

JOHN D. RANDOLPH, *Primary Examiner.*

WALTER A. MODANCE, *Examiner.*

NATALIE TROUSOF, *Assistant Examiner.*